K. G. DIETERICH.
LOCKING SAFETY PIN.
APPLICATION FILED DEC. 5, 1907.
1,119,497.
Patented Dec. 1, 1914.
2 SHEETS—SHEET 1.
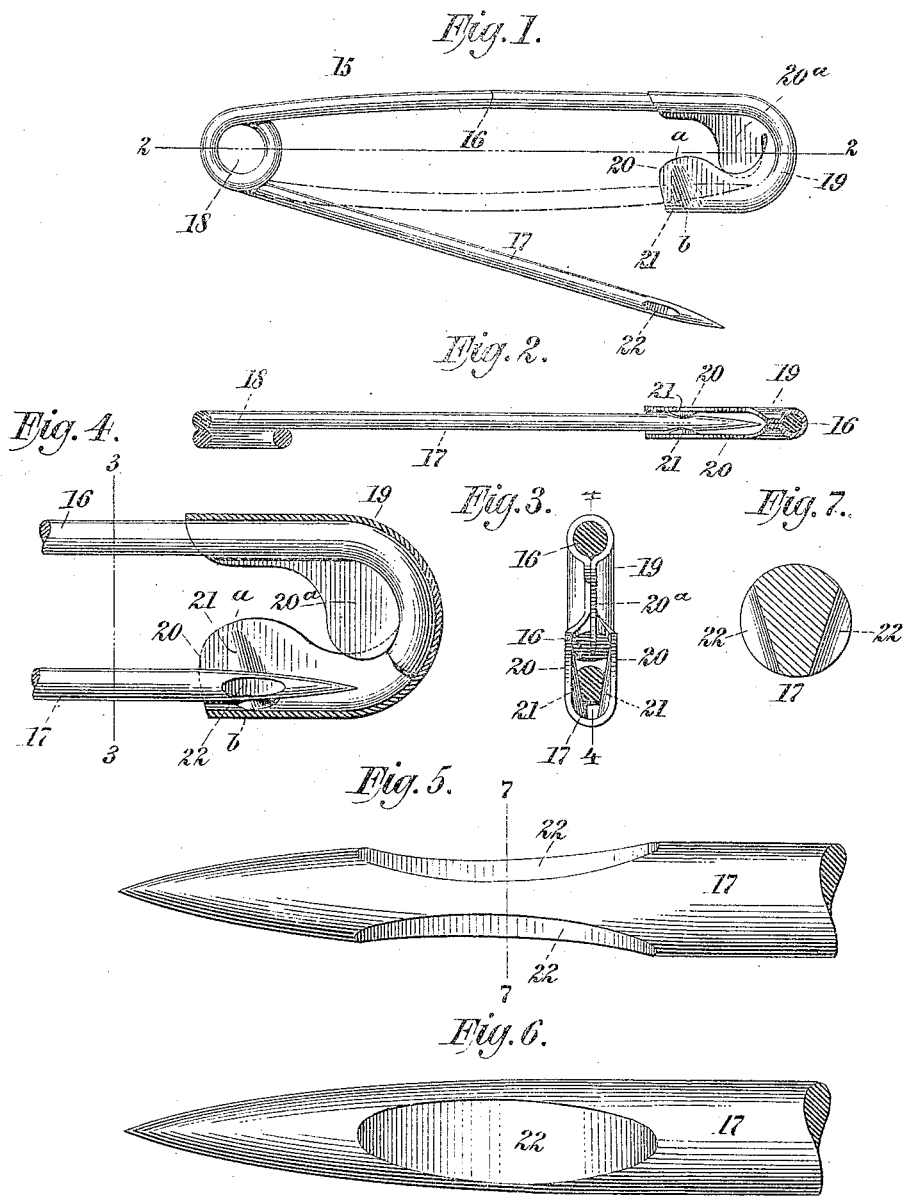

K. G. DIETERICH.
LOCKING SAFETY PIN.
APPLICATION FILED DEC. 5, 1907.

1,119,497.

Patented Dec. 1, 1914.
2 SHEETS—SHEET 2.

WITNESSES:
Gustave Dieterich
Edwin V Dieterich

INVENTOR
Karl G. Dieterich
BY
Conrad A. Dieterich
his ATTORNEY

UNITED STATES PATENT OFFICE.

KARL G. DIETERICH, OF NEW YORK, N. Y.

LOCKING SAFETY-PIN.

1,119,497.

Specification of Letters Patent.

Patented Dec. 1, 1914.

Application filed December 5, 1907. Serial No. 405,167.

*To all whom it may concern:*

Be it known that I, KARL G. DIETERICH, a subject of the German Emperor, residing at the city of New York, borough of Brooklyn, Kings county, in the State of New York, have invented certain new and useful Improvements in Locking Safety-Pins, of which the following is a full, clear, and exact specification.

My invention relates generally to fastening devices, and the same has for its object more particularly to provide a neat, simple, efficient and reliable safety pin, wherein the point end of the pin may be securely locked within its cap or guard.

Further, said invention has for its object to provide a safety pin wherein the coöperating locking parts may be guided into proper engagement with each other.

Further, said invention has for its object to provide a safety pin which is so constructed that the coöperating locking parts will enter into locking engagement even though said coöperating parts may be slightly out of register when brought together just prior to the locking of said parts together.

Further, said invention has for its object to provide a safety pin which is so constructed that the locking means cannot wear out or become broken by continued use or when subjected to strain or tension.

Further said invention has for its object to provide a safety pin which is so constructed that the recessed portion in the pin will not produce a hole in the fabric of larger diameter than the body of the pin when the same is passed through said fabric.

To the attainment of the aforesaid objects and ends my invention consists in the novel details of construction, and in the combination, connection and arrangement of parts hereinafter more fully described and then pointed out in the claims.

Figure 8:
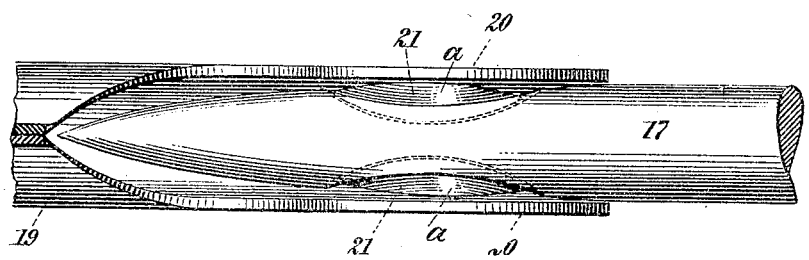
Figure 9:
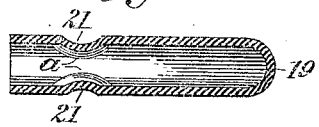
Figure 10:
Figure 11:
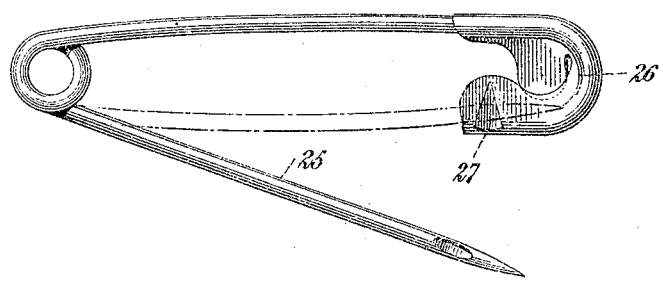
Figure 12:
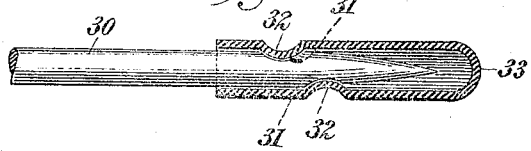

In the accompanying drawings, forming part of this specification, wherein like numerals of reference indicate like parts, Figure 1 is a side view illustrating one form of safety pin constructed according to and embodying my said invention, the said pin being shown open in full lines and locked to its closed position in dotted lines; Fig. 2 is a longitudinal section taken on the line 2—2 of Fig. 1; Fig. 3 is an enlarged detail transverse section taken on the line 3—3 of Fig. 4; Fig. 4 is a partial side view also enlarged, showing the cap portion in section, and the pin in position and locked within the cap; Fig. 5 is a detail bottom view greatly enlarged, showing the point end of the pin; Fig. 6 is a side view thereof; Fig. 7 is a section taken on the line 7—7 of Fig. 5; Fig. 8 is a top view greatly enlarged and partly in section, showing the point end of the pin locked in position within the cap; Fig. 9 is a section of the cap taken on the line 9—9 of Fig. 4; Fig. 10 is a partial bottom view of the cap showing a portion of the pin; Fig. 11 is a side view showing a modified form of pin, on which the tapering projections are arranged vertically in the cap, and Fig. 12 is a detail longitudinal section showing a further modification adapted for very small pins in which the projections are staggered.

In said drawings 15 denotes the pin as a whole, formed essentially of a single piece of wire and comprising a body portion 16, a pin 17, and an integral spring 18 formed at the junction of said body portion 16 and spring 17.

The free end of the body portion 16 is rounded and upon said rounded end is secured a cap 19 formed of a single piece of sheet metal partly conformed to said rounded end and having an integral guide 20ª and parallel side plates or members 20 20 adapted to receive the point end of the pin 17. In said side plates or members 20 20 are provided inwardly-extending inclined, tapering projections 21 21 which are arranged with their smaller ends $a$ uppermost and their broader lower ends $b$ converging toward each other at or near the lower edge of the cap 19. The projections 21, 21 are preferably arranged opposite to each other near the open end of said cap 19 in order that their rounded tapering edges shall form a substantially V-shaped groove or recess to receive the point end of the pin 17.

The pin member 17 is provided at the opposite sides of its tapering portion or point end with elongated, longitudinal recesses 22 22 which converge toward each other at the lower or underside of the pin 17 thus providing a greater surface upon the upper side of the pin intermediate the upper edges of said elongated recesses 21 21 than at their lower edges. The said elongated recesses are so constructed and arranged that when the point end of the pin is introduced into the cap, and in position above the upper or smaller ends of the inwardly tapering projections 21, 21 the said tapering projections will serve to guide the elongated longitudinal recesses 22 22 in the pin 17 downwardly into the cap to the point where said elongated recesses 22.22 in the pin point will conform substantially to the bases of said tapering projections 21 21 in the cap and be engaged thereby throughout their entire length in order to hold the point firmly wedged within the cap.

By making the recesses 22 22 in the pin 17 elongated provision is made for slight variations which occasionally occur in the coiling of the body portion 16 to produce the spring 18 and thus insure the end of the pin being drawn into engagement with said projections 21, 21 when the point is brought into position within said cap and above the upper ends of said projections. When the pin 17 is properly locked within the cap 19 and the recesses 22 22 therein engaged by the tapering projections 21, 21 of the cap and the pin as a whole subjected to strain or tension it will have the effect to bow the pin 17 and in so doing hold said projections 21, 21 and recesses 20, 20 properly locked together.

In the modification shown at Fig. 11, the pin 25 is constructed essentially as above described, except that the cap 26 is provided with oppositely arranged projections 27 at right angles to the longitudinal axis of the pin as a whole.

At Fig. 12 is shown a further modification which is adapted for use in connection with very small pins made of wire or small gage, and in order to render the locking means effective the pin 30 is provided in its point end with staggered projections 31, 31 which are adapted to engage correspondingly staggered projections 32, 32 on the cap 33.

Having thus described my invention, what I claim and desire to secure by Letters Patent is:

1. A locking safety pin comprising a body portion, a cap secured thereon, a forwardly inclined, inwardly-extending projection on said cap, and a pin extending from said body portion adapted to be held in wedging engagement with said tapering projection, substantially as specified.

2. A locking safety pin comprising a body portion, a cap secured thereon, a forwardly inclined, inwardly-extending tapering projection on said cap having its broader portion arranged longitudinally of the pin adjacent to the lower edge of said cap, and a pin extending from said body portion adapted to be held in wedging engagement with said tapering projection, substantially as specified.

3. A locking safety pin comprising a body portion, a cap secured thereon, inwardly extending tapering inclined projections upon said cap with their small ends uppermost, and a pin adapted for engagement with said tapering projections, substantially as specified.

4. A locking safety pin comprising a body portion, a cap secured thereto, inwardly-extending tapering projections having their small ends uppermost and their broader lower ends arranged longitudinally of said pin converging toward each other, and a pin adapted to be engaged by said tapering projections adjacent to their broader ends, substantially as specified.

5. A locking safety pin comprising a body portion, a cap secured thereto having side members and inclined tapering projections arranged on the opposite sides of said side-members, having their smaller ends uppermost and their broader lower ends converging toward each other, and a pin having recesses therein conforming substantially to cesses therein conforming substantially to said tapering projections and adapted to be held in wedging engagement therewith, substantially as specified.

Signed at the city of New York, in the county and State of New York, this second day of December, nineteen hundred and seven.

KARL G. DIETERICH.

Witnesses:
 CONRAD A. DIETERICH,
 A. R. ANGUS.